United States Patent [19]

Mumford

[11] 4,450,741

[45] May 29, 1984

[54] MULTIPLE GOB SHEARING MECHANISM OPERATING IN A STRAIGHT LINE

[75] Inventor: Eustace H. Mumford, Ottawa Lake, Mich.

[73] Assignee: Owens-Illinois, Inc., Toledo, Ohio

[21] Appl. No.: 398,122

[22] Filed: Jul. 14, 1982

[51] Int. Cl.$^3$ .............................................. C03B 5/38
[52] U.S. Cl. ........................................ 83/623; 83/620; 65/133; 65/334
[58] Field of Search .................... 83/598, 600, 623; 65/133, 334

[56] References Cited

U.S. PATENT DOCUMENTS

| | | | |
|---|---|---|---|
| 3,435,719 | 4/1969 | Wythe | 83/623 |
| 3,579,319 | 5/1971 | Wythe et al. | 83/623 X |
| 3,592,938 | 7/1971 | Bracken et al. | 83/598 X |
| 3,677,732 | 7/1972 | Dornan | 83/600 X |
| 3,996,037 | 12/1976 | Wythe | 83/623 X |
| 4,174,647 | 11/1979 | Dahms | 83/623 X |

Primary Examiner—Donald R. Schran
Attorney, Agent, or Firm—Gerald T. Welch; Myron E. Click

[57] ABSTRACT

Apparatus for the shearing of three or more gobs of glass simultaneously wherein the shear mechanism is of the straight line type such that the shears move toward and away from each other with linear motions and the shearing mechanism is provided with drop guides which will function to control the drop of the gob after it has been sheared and in which the drop guides which are carried by the mechanism which drives the upper shear blades may be adjusted with respect to the instant when they will be arrested in their movement and this adjustment may be carried out on the fly with the individual drop guide for each of the gobs being individually adjustable while the mechanism is in operation without requiring interruption of the feeding of glass gobs to the forming machines that are being served.

8 Claims, 7 Drawing Figures

MULTIPLE GOB SHEARING MECHANISM OPERATING IN A STRAIGHT LINE

BACKGROUND OF THE INVENTION

It has been the practice to feed gobs of molten glass to glass forming machines at a rate of up to 20 gobs per minute for each mold cavity depending upon the weight of the gob. These gobs are formed by the shearing of a stream of glass issuing from the bottom of a forehearth. The shearing mechanism used in these operations have been the type which swing generally about a pivot point adjacent one side of the end of the feeder, or what is more commonly termed "feeder bowl," and the two blade arms operate much as the blades of a scissors, to bring the two shear blades, which are carried at the outer ends of the shear arm, into overlapping relationship on the axis of the stream of glass. With the advent of more productive machines, which will handle three or more gobs of glass simultaneously, there has become a necessity for feeder mechanisms, which can consistently shear three or more streams of glass into gobs simultaneously, at a controlled repetitive rate for feeding the higher productivity glass forming machine, and in particular glass bottle forming machines.

By way of background, several recent patents have issued on straight line glass stream cutting apparatus. One U.S. patent is U.S. Pat. No. 3,592,938 issued July 13, 1971 to R. S. Bracken et al. In this patent, the two shear blade holders are moved toward and away from each other by an interconnecting rack and pinion arrangement with a drive lever or link coming from the normal shear drive cam oscillating a lever, which in turn is coupled to one of the shear arm holders. This shear arm holder carries a rack which drives through a pinion to a second rack carried by an opposite or opposing shear blade holder and oscillation of the drive rod will cause the shear blades to move toward and away from each other along essentially a straight line, since both blade holders are mounted for movement along horizontal rods positioned at one side of the area of the feeder bowl axis.

A second U.S. Pat. No. 4,174,647 issued Nov. 20, 1979 in the name of Dahms, and the several divisions thereof, also disclose a straight line shear mechanism. In this particular patent, there is shown in FIG. 1 a shear mechanism comprising a generally horizontal frame, which includes end plates that are interconnected by side rails. The side rails, along with supporting rods for the shear blade holders, constitute a rectangular frame which surrounds the axis of the streams of molten glass that would issue from the feeder. This frame is mounted to a post which, as stated in the patent, is mounted to a feeder bowl by any suitable means. The particular shear mechanism described in this patent is air operated, in that it has an air motor which is used to provide the driving force for the shear blades as they reciprocate toward and away from each other while guided by the side rails. In addition, this patent shows drop guides which are adjustable relative to their mounting and the blade carrying mechanism.

With the foregoing in mind, it is an object of this invention to provide apparatus which will move the shear blades into and out of engagement with the stream of glass to form gobs wherein the shear blades move in straight paths, relative to each other, both toward and away from each other. By providing the parallel operating shear arm mechanism, it is believed that a superior and better control of the shear operation can be obtained. One of the draw backs with respect to the shearing of multiple gobs with arms which operate in effect from adjacent pivot axis at one side or the other of the feeder bowl, is that the shear blades are moving through plural arcs rather than moving straight across the stream of glass. With the shears moving through arcs, it is even more difficult sometimes to accurately control the degree of overlap of the shears, and by reason of the outer shears moving at a slightly greater velocity than the shears more closely positioned relative to the pivot points, there is a tendency for the shear mechanism to inconsistently cut all of the multiple gobs at the same weight, and provide the gobs to the forming machine such that they are all of the same and consistently equal weights through an extended period of plural gob feeding.

An additional object of the present invention is to provide a mechanism in which the shear blade mounting mechanism is supported such that it may be swung away from the area of the feeder for repairs or to provide access to the bottom of the feeder.

It is a further object of the present invention to provide a mechanism which is movable out of the shear area without interferring with or requiring the specific interruption of the glass stream, if that is desired, to be permitted to continue to run from the feeder.

It is an additional object of this invention to provide a drop guide mechanism which moves with the shear blades of the upper shear blades and to provide a mechanism for arresting the movement of the drop guide at a precise location without the requirement of a complicated mechanical system which would be subject to excessive wear.

SUMMARY OF THE INVENTION

Apparatus for shearing multiple streams of molten glass into gobs which are issuing from a plural orifice feeder bowl in which the shear blades are mounted on reciprocable slides that move toward and away from each other on a linear path. The movement of a slides toward and away from each other are affected by the oscillation of a crank sleeve having radially extending arms, one of which is connected to each of the drive links so as to move them toward and away from each other in response to the rotation of the sleeve, which in turn is mounted for oscillation about a vertical axis. Drop guides which are carried by the upper shear mechanism are spring biased and adjustable on the fly so as to to affect the arresting movement of the drop guides at a preselected position during the operation of the shear mechanism.

BRIEF DESCRIPTION OF THE DRAWINGS

FIG. 2(a) is an exploded view, on an enlarged scale of one of the rear guide mounts of FIG. 2;

DETAILED DESCRIPTION OF THE DRAWINGS

Figure 1:
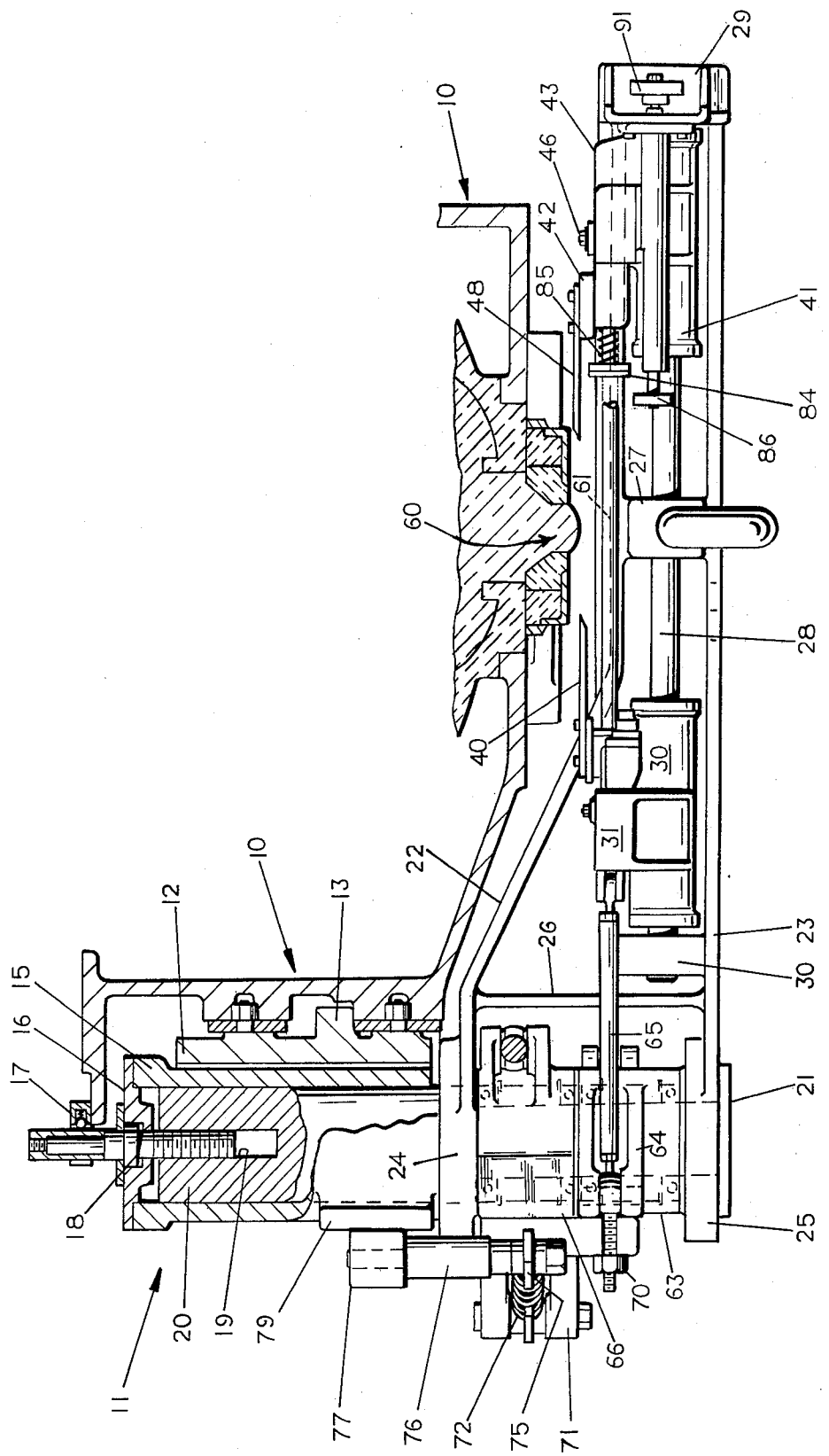
FIG. 1 is a side elevational view of the glass shear apparatus of the invention.
Figure 2:
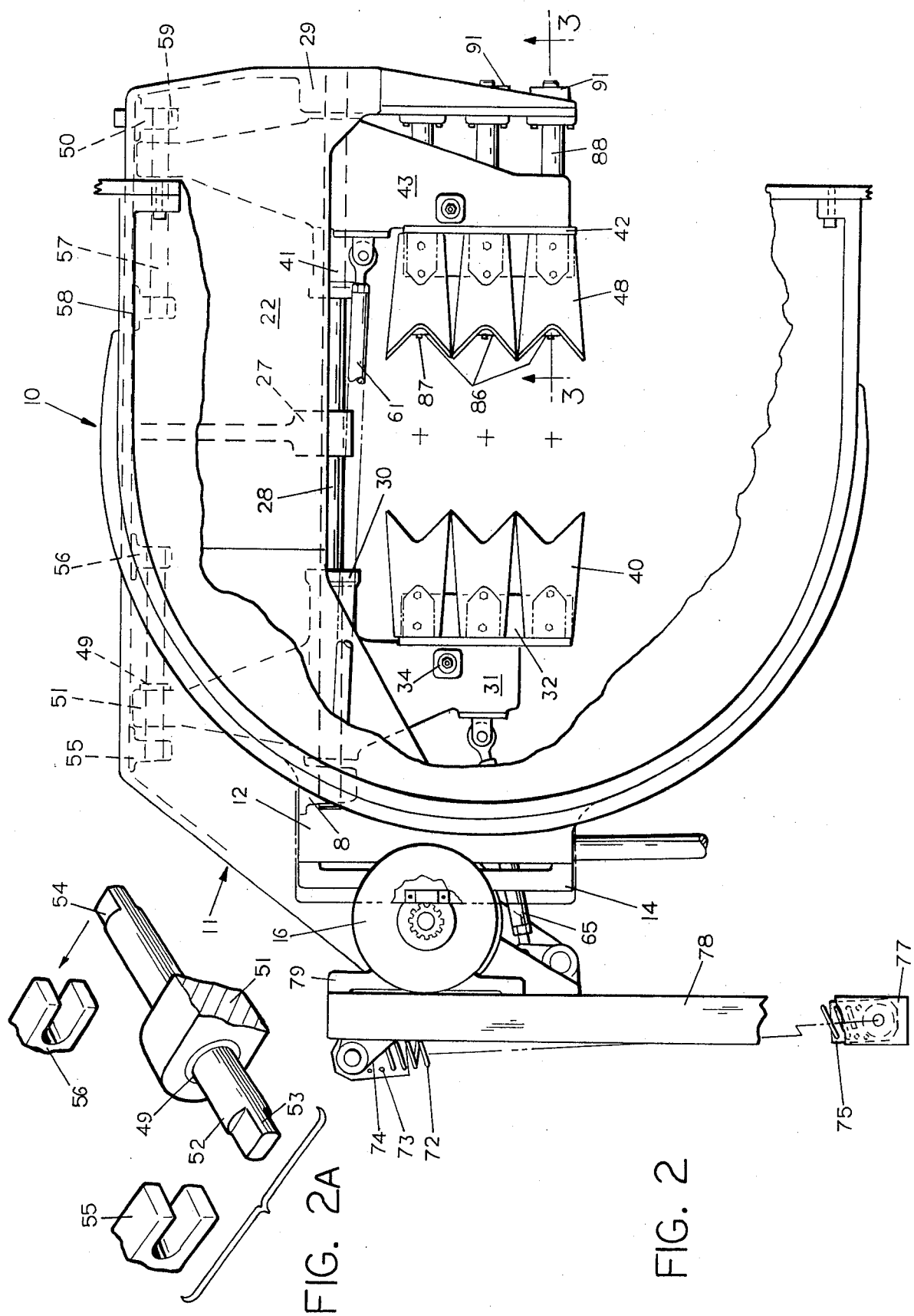
FIG. 2 is top plan view of the apparatus of FIG. 1 with the orifice structure removed.
Figure 4:
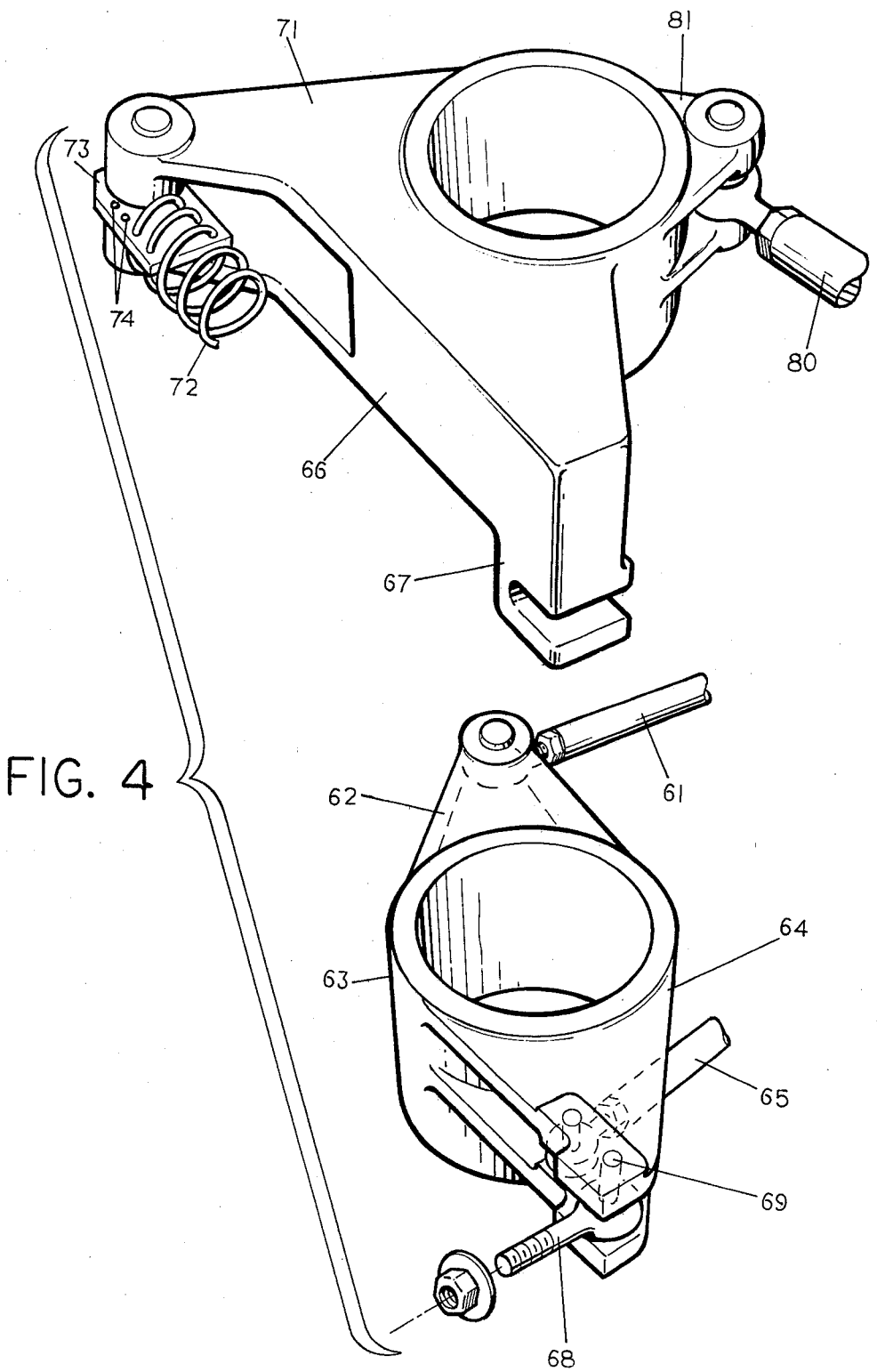
FIG. 4 is a exploded, enlarged, perspective view of the drive linkage shown in FIGS. 1 and 2.

With particular reference to FIGS. 1 and 2, the present invention will be described in detail. A feeder bowl generally designated 10, as can be seen when viewed in FIG. 2, takes the general shape of a horse shoe opening to the right. This bowl 10 is normally made of heat resistant metal such as iron or steel. To the forward end or to the left as viewed in FIG. 2, of the feeder bowl is mounted a shear mechanism mounting member generally designated 11. Shear mount 11 comprises a horizontally extending support member 12, which is bolted to the side of the feeder bowl 10, and is provided with an overhanging lip portion 13, which overhangs an indentation or ring formed in the outer surface of the feeder bowl 10. The mount 12, shown in FIG. 2, extends along one side of the feeder bowl and its ends are connected by a web 14 to a vertical mounting tube generally designated 15. The tube 15 is provided with a cover 16 through which a vertical adjusting screw 17 extends. The adjusting screw 17 is provided with a collar 18 which sets within a recess formed in the cover 16. The lower end of the screw 17 is threaded into a threaded opening 19 provided within an axial opening formed in a main mounting shaft 20. The shaft 20 extends downwardly through and extends below the tube 15 and at its lower end is provided with a radial flange 21. The shaft 20 carries, at spaced apart intervals thereof, a pair of outwardly extending supporting arms 22 and 23. The upper supporting arm 22 extends downwardly at an angle and serves, as will later be described as a main frame member for the shear mechanism. It should be understood the the arms 22 and 23 are provided with annular members 24 and 25 respectively which surrounds the shaft 20. Between the positions 24 and 25 on the shaft 20, there are provided a pair of operating links which are shown in an exploded detail in FIG. 4. Each of the links serves to operate a portion of the shear supporting structure of the invention. The upper casting 22, as shown in FIG. 2 at the upper portion thereof, forms a generally flat horizontal surface which spans the width of the bowl 10. The lower casting 23 also is coextensive in configuration to that of the casting 22. It should be pointed out that several webs, such as the web 26, span the space between the two castings 22 and 23. Another support web 27 is visible behind the mold charge in FIG. 1 and is shown in FIG. 2 as extending from the forward edge of the casting 22 to the rear wall portion thereof.

Figure 5:
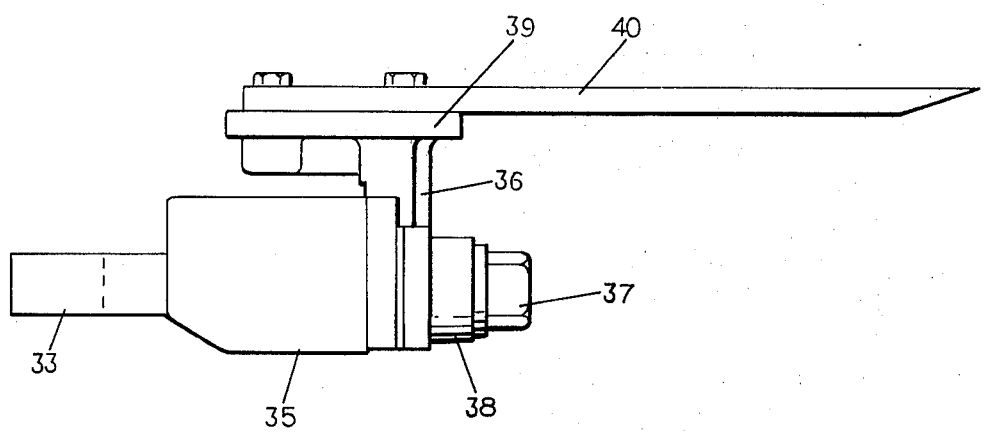
FIG. 5 is an enlarged view of the left hand blade mounting mechanism of FIG. 1.
Figure 6:
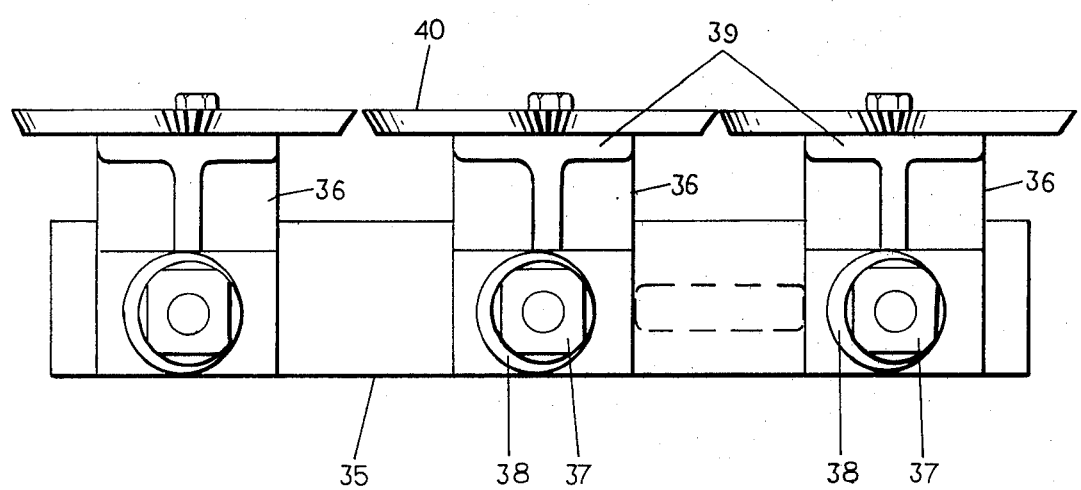
FIG. 6 is an end view of the mount of FIG. 5.

A generally horizontal shaft 28, is anchored at the right hand end, as viewed in FIG. 2, in an end member 29 and is anchored at its left hand end in a mounting boss 8. The shaft 28 supports an elongated horizontal bearing member 30. Bearing member 30 has a forwardly extending portion 31, as viewed in FIG. 2. This extending portion 31 serves as the mounting member for a shear blade holder 32. The holder 32 is shown in detail in FIGS. 5 and 6 and generally comprises a forwardly extending mounting bifurcated member 33, which is adapted to extend into a slot formed in the portion 31 of the bearing 30.

A fastener, or bolt 34, extends downwardly through the member 31 and serves as a clamping member for the bifurcated mounting member 33 of the shear blade holder. The holder further takes the form of an elongated, bar like, member 35 to the forward edge to which are mounted individual shear blade mounting posts 36.

Each of the post 36 are essentially identical in configuration and are provided with a hole therethrough through which a bolt 37 extends. It should be understood that the bolt 37 threads into the bar 35. In addition to the bolt 37, an eccentric ring 38 which surrounds the bolt is provided which surrounds and extends through the opening in the post 36. Rotation of the ring 38, since it is eccentric to the axis of the bolt 37, will affect the raising or lowing of the post 36, depending upon the setting and the tightening of the bolt 37, will then clamp the eccentric ring in the position that has been selected. The posts 36 have an upper horizontally extending surface portion 39. It is the surface portion 39 on which the individual shear blades 40 are bolted. Thus, it can be seen that the shear blades 40 may be individually set at a precise height depending upon the adjustment of the mechanism. The right hand side of the shear carriage is of a form similar to that shown with respect to the left hand side, when viewed in FIGS. 1 and 2, in that there is a bearing 41 surrounding the shaft 28 and serves to support and guide the right hand shear blade holder 42. The shear blade holder 42 is mounted to an extending portion 43 formed integral with the bearing 41 and is bolted thereto by a bolt 44 shown in FIGS. 2 and 3.

Figure 3:
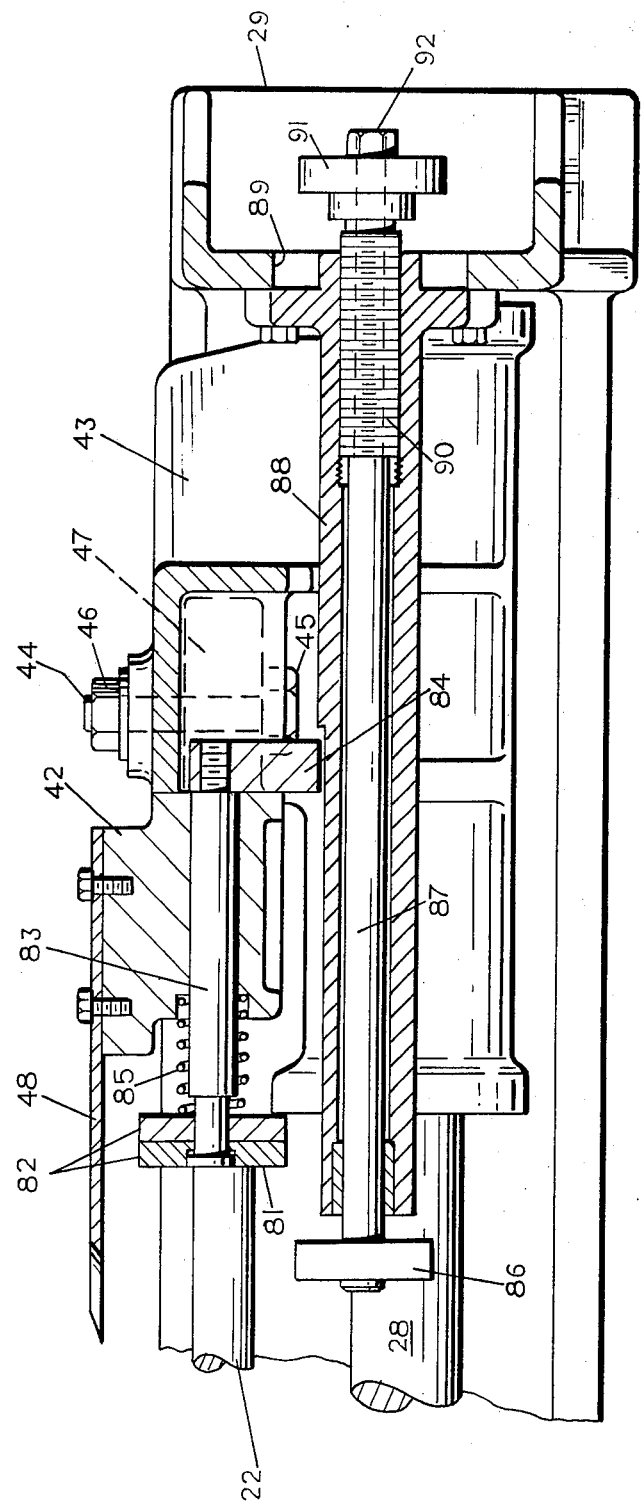
FIG. 3 is an enlarged scale, cross-sectional view taken at line 3—3 of FIG. 2.

As can best be seen in FIG. 3, the bolt 44 extends upwardly through the portion 43 and has its head 45 visible beneath the blade holder portion. A nut 46 threaded on the bolt 44 actually holds down the blade holding mechanism in the position shown with the blade holder 42 having a bifurcated portion 47 formed integral therewith. The right hand shear blades 48 are bolted to the upper surface of the shear blade holder 42.

With specific reference to FIG. 2, the members 43 and 31 extend beyond the bearing members 30 and 41 and are provided at their extended ends with sleeve bearings at 49 and 50, respectively. The sleeve bearing 49 is shown mounted within the extending end of the member 51 in the exploded detail of FIG. 2A. The bearing 49 rides on a pin 52 which has flattened ends 53 and 54. The flattened ends 53 and 54 are loosely retained within outstanding, bifurcated, mounting members 55 and 56. The sleeve bearing 50 is similarly mounted on a pin 57 which is also loosely retained by a pair of mounting members 58 and 59. With the particular way and manner shown, the shear blade holders and the mechanisms which support them may be moved toward and away from each other to effect shearing of glass which would be issuing from an orifice 60 of the feeder bowl 10.

Blade holder 42 is connected by a drive link 61 to a radially extending arm portion 62 of an actuator sleeve 63, which is mounted for rotation by suitable bearings to the lower portion of the mounting shaft 20, as best shown in FIG. 1. A second radial arm 64, which generally extends outwardly from the sleeve 63 at a postion 180° removed from the radial arm 62 carries, through pivotal means, a drive link 65. The drive link 65 is connected by a pivoting means to the blade holder 31.

With the arrangement as shown in FIGS. 1 and 2, oscillation of the sleeve 63 about its vertical axis will affect the movement of the shear blades 40 and 48 into overlapping relationship so as to the shear the glass stream. It can readily be seen that the blade 48 pass over the blade 40 and affect the simultaneous cutting of the charges of glass which, in the present illustration, is 3 gobs.

The sleeve 63 is oscillated by a drive sleeve 66, which is mounted for rotation about the axis of the mounting shaft 20, and is positioned directly above the sleeve 63. The sleeve 66 has a forwardly extending and downwardly opened slotted portion 67 formed integral therewith. The slot in the member 67 is adapted to receive a threaded bolt 68 which is in the form of an "eye" that is connected by a pin 69 to the extending radial arm 64 of the sleeve 63. A retaining nut 70 is adapted to thread onto the bolt 68 and to retain the member 67 in engagement with and serving to drive the sleeve 63. The drive sleeve 66 has a second radially extended arm 71 to which is fixed one end of a coil spring 72. The actual manner of attaching the coil spring 72 to the arm 71 is by way of a plate 73 which has a series of holes 74 therethrough and the end of the spring 72 is threaded and rotated such that several of its coils will enter and pass through the holes and in that manner connect itself by the plate 73 to the radial arm 71. The opposite end of the spring 72 is similarly connected to a plate 75, (See FIG. 1) which is fixed to the lower end of a mounting post 76. The post 76 is fixed to the extending end 77 of an elongated bar 78 whose other end is fixed to the vertical tube 15 by way of a mounting bracket portion 79 thereof.

The drive sleeve 66 is operated through a link 80 which is pivotally connected to a third extending arm portion 81 of the sleeve 66. This link 80 is operated from a shear cam in a manner well known in the art. It being understood that the shear cam is driven in synchronism with the feeder so as to coordinately operate to cause the shear blades to move away from each other into the open position as shown in FIG. 2, and that upon release of the opening force by the link 80, the spring 72 will move the shear blades toward each other in overlapping relationship to shear the streams of glass which have issued through the orifices in the bottom of the feeder bowl.

In the operation of the shear blades it is important that the upper shear, as it cuts across the lower shear, does not disturb the vertical drop of the gob and, as would be expected, the lower shear will tend to push the top of the last severed portion of the gob to the right as viewed in FIGS. 1, 2 or 3. With this in mind, a drop guide 81 is provided which will engage the side of the gob of glass as it is sheared, and will prevent the gob from moving out of the path of its vertical travel. The drop guide 81 is in the form of a plate 82 and additional plates, could be added to the end of the mounting to affect a positioning of the drop guide farther to the left as viewed in FIG. 3. The drop guide members 82 are mounted on the end of a shaft 83. In actual practice the shaft 83 extends through the shear blade holder 42 and, at its opposite end, is threaded into a stop member 84. The shaft 83 is biased in the direction shown in FIG. 3 by a spring 85. The spring 85 will maintain the stop member 84 in engagement with the rear portion of the blade holder 42, as shown in FIG. 3.

The function of this mechanism will be described in connection with an adjustable stop 86 which will engage the member 84 as the shear blade 48 is moved into and through the shearing zone. When the stop member 84 engages the stop 86, the drop guide 81 will discontinue its movement with the blade 48 and at that point in its operation will engage the gob of glass that has been severed and which is being influenced by the lower shear blade 40 to thus prevent the gob from rotating or moving side ways out of what is supposed to be a perfectly vertical travel of the gob of glass from the feeder bowl to the mold positioned therebelow. The position of the stop 86 is adjustable since it is mounted on the end of a shaft 87 with the shaft being threaded in a sleeve 88 which is bolted to the casting or end member 29. A portion of the sleeve 88 extends through an opening 89 in member 29 and the shaft 87 is provided at its right hand end with threads 90 which engage with threads formed within the sleeve 88. A handle member 91 is fixed to the end of the shaft 87. The end of the shaft 87 which carries the threaded sleeve portion 90 is provided with handle portion 91 held by a bolt 92 so that rotation of the handle will affect the relative position of the stop 86 with respect to the sleeve 88 through which its shaft 87 is guided. In this manner the position of the stop 86 may be adjusted horizontally and, as can be seen from FIG. 1, each of the drop guides, which is associated with each of the shear blades, may be individually adjusted so that the shear mechanism may be finely tuned to provide the best delivery of gobs with the least disturbance of the gobs. It also should be pointed out that this adjustment of the stop position of the drop guide 81 may be made while the shear mechanism is in operation since there is no physical connection between the stop member 84 and stop 86 except at the moment when the stopping is to be affected and the adjustment of the stop 86 may be affected by the operation of mechanisms which are not in motion, namely, the handles 91 which are connected to rods 87 which in turn serve to mount the stops 86.

This ability to make this adjustment on the fly is quite significant and provides a much needed system for individually adjusting drop guides in their stopping positions on a multiple gob shearing mechanism and in the present case may be affected on a straight line mechanism which also has obvious advantages when considering the cutting of multiple gobs over the pivoted type.

What is claimed is:

1. Apparatus for shearing multiple streams of molten glass into gobs comprising a feeder bowl having a plurality of in-line openings extending through the bottom thereof through which molten glass issues, a vertical post, means mounting said post to the side of the feeder bowl, a carriage cantilevered from the lower portion of said post, said carriage extending normal to the line of said openings, at one side thereof, a first pair of horizontally spaced axially aligned shafts carried by said carriage, a second, horizontally spaced, shaft extending parallel to said first pair of shafts, a pair of opposed slides mounted to move on said first and second shafts, drive sleeve means mounted for rotation about the axis of said post, a first drive link connected between one side of said drive sleeve and one slide, a second drive link connected between the opposite end of said drive sleeve and the other slide, means connected to said drive sleeve for biasing said sleeve in a clockwise direction, means connected to drive sleeve for oscillating said sleeve about the axis of the post, and means for mounting shear blades on said slides for relative movement to shear the streams of molten glass.

2. The apparatus of claim 1, further comprising means connected to said post for adjusting the height of said post relative to the feeder bowl.

3. The apparatus of claim 1 further including drop guide means carried by one of said slides beneath the shear blades carried thereby.

4. The apparatus of claim 3 wherein said drop guide means includes an individual drop guide for each shear blade that is to overlap an opposite blade.

5. The apparatus of claim 3 wherein said drop guides are spring biased and further including stop means for arresting the movement of said drop guide means at a preselected position.

6. The apparatus of claim 5 wherein said stop means comprises a fixed member positioned in the path of movement of said guide support.

7. The apparatus of claim 5 wherein said stop member is an adjustable member positioned in the path of movement of the drop guide support and means for adjusting said stop member while the shear blades are in operation.

8. Apparatus for shearing multiple streams of molten glass into gobs comprising a feeder bowl having three or more openings extending through the bottom thereof through which molten glass issues, a vertical post, means mounting said post to the side of the feeder bowl, a carriage comprised of a pair of vertically spaced, horizontally extending plates cantilevered from the lower portion of said post, said carriage extending from said post, below and to one side of said openings to the opposite side thereof, a first horizontal shaft carried by said carriage between said plates at adjacent the forward edge thereof, a first slide mounted to move axially on said shaft, a second slide positioned opposite said first slide and mounted for relative movement on said first shaft, a pair of second horizontal shafts carried by said carriage parallel to said first shaft, and adapted to support and guide said first and second slides, respectively, for movement toward and away from each other, a first drive sleeve having a pair of actuating arms mounted for rotation about the axis of said post, a second drive sleeve mounted on said post adjacent said first sleeve, a first drive link connected between one arm of said first drive sleeve and said first slide, a second drive link connected between the other arm of said first drive sleeve and said second slide, means interconnecting said first and second drive sleeves, means connected to said second drive sleeve for biasing said second sleeve in a clockwise direction, means connected to second drive sleeve for oscillating said sleeve about the axis of the post and a plurality of complementary shear blades mounted on said slides for relative movement to effect shearing of the streams of molten glass.

* * * * *